United States Patent [19]

van der Burgt et al.

[11] Patent Number: 5,695,042

[45] Date of Patent: Dec. 9, 1997

[54] CONVEYOR

[75] Inventors: Cornelis H. M. van der Burgt, Uden;
Antonius A. J. Ketelaars, Veghel;
Jacobus M. van den Goor, Nuenen, all of Netherlands

[73] Assignee: Vanderlande Industries Nederland B.V., Veghel, Netherlands

[21] Appl. No.: 755,955

[22] Filed: Nov. 25, 1996

[30] Foreign Application Priority Data

Nov. 27, 1995 [NL] Netherlands .................. 1001748

[51] Int. Cl.⁶ .................................................. B65G 47/66
[52] U.S. Cl. .................................................. 198/600
[58] Field of Search .................................. 198/539, 600

[56] References Cited

U.S. PATENT DOCUMENTS

| | | | |
|---|---|---|---|
| 1,030,479 | 6/1912 | Ofstad | 198/600 X |
| 1,202,574 | 10/1916 | Parker | 198/600 X |
| 1,537,914 | 5/1925 | Bausman | 198/600 X |
| 2,268,724 | 1/1942 | Shackelford . | |
| 2,517,983 | 8/1950 | Crosland | 198/600 X |
| 2,684,147 | 7/1954 | Holstebro . | |
| 4,288,208 | 9/1981 | Küsters | 198/600 X |
| 4,759,673 | 7/1988 | Pearce et al. | 198/600 X |
| 4,934,513 | 6/1990 | Kirkpatrick et al. . | |
| 5,044,485 | 9/1991 | Loder | 198/600 X |
| 5,314,057 | 5/1994 | Calvert et al. . | |

FOREIGN PATENT DOCUMENTS 9212012.1  2/1993  Germany .

*Primary Examiner*—James R. Bidwell
*Attorney, Agent, or Firm*—Oblon, Spivak, McClelland, Maier & Neustadt, P.C.

[57] ABSTRACT

The invention relates to a conveyor comprising at least two endless conveyor belts being in line, whereby the facing ends of said conveyor belts are positioned near each other and whereby the upper parts of the belts being utilized for transporting goods during operation at least substantially lie in one plane. The end of one conveyor directed towards the end of the other conveyor is deflected downwards and is disposed under the nearby end of said other conveyor. A filling piece is provided above the part of the downwardly deflected end of the one conveyor that is positioned beside the respective end of the other conveyor, whereby the upper surface of said filling piece at least substantially lies in one plane with the upper parts of the belts being utilized for transporting goods during operation.

3 Claims, 1 Drawing Sheet

CONVEYOR

The invention relates to a conveyor comprising at least two endless conveyor belts being in line, whereby the facing ends of said conveyor belts are positioned near each other and whereby the upper parts of the belts being utilized for transporting goods during operation at least substantially lie in one plane.

Conveyors of this type have been used for transporting goods for many years already, whereby goods to be moved are transferred from one conveyor belt to the other conveyor belt at the location of the neighbouring ends of the conveyor belts. In practice it has become apparent thereby that projecting parts of the goods may get jammed between the ends of the conveyor belts at the transition from one conveyor belt to the other, as a result of which the transport of the goods is interrupted and/or the goods are damaged. This problem occurs inter alia with the transport of luggage at airports, whereby wheels or the like, for example, with which suitcases are provided, may get jammed between the neighbouring ends of the conveyor belts.

In order to obviate this drawback it has been common practice for a number of years to dispose the successive conveyor belts at a small angle with respect to the horizontal, in such a manner that the goods must fall a small distance from the end of one conveyor belt onto the next conveyor belt. This solution is satisfactory per se, but on the other hand it has several drawbacks. Thus the positioning of the conveyor belt at the correct oblique angle in the conveyor frame is a laborious and therefore costly activity. In addition to that the objects produce objectionable noise when falling from one conveyor belt onto the other at the transition, which is especially unpleasant when large numbers of goods are to be transported in conveying systems comprising several transitions between successive conveyor belts.

According to the invention the end of one conveyor directed towards the end of the other conveyor is deflected downwards and is disposed under the nearby end of said other conveyor, whilst a filling piece is provided above the part of the downwardly deflected end of the one conveyor that is positioned beside the respective end of the other conveyor, whereby the upper surface of said filling piece at least substantially lies in one plane with the upper parts of the belts being utilized for transporting goods during operation.

By using the construction according to the invention the effectively operative upper parts of the belts and the upper surface of the filling piece form a continuous flat surface over which the objects are transported, so that objectionable noises caused by falling goods are avoided, whilst there is still no risk that parts of the objects being transported will get jammed between the neighbouring ends of the belts. It has furthermore become apparent thereby that this construction can be manufactured and installed considerably cheaper and faster than the usual conveyors comprising sloping conveyor belts that have been used so far.

The invention will be explained in more detail hereafter with reference to the accompanying Figures.

Figure 1:
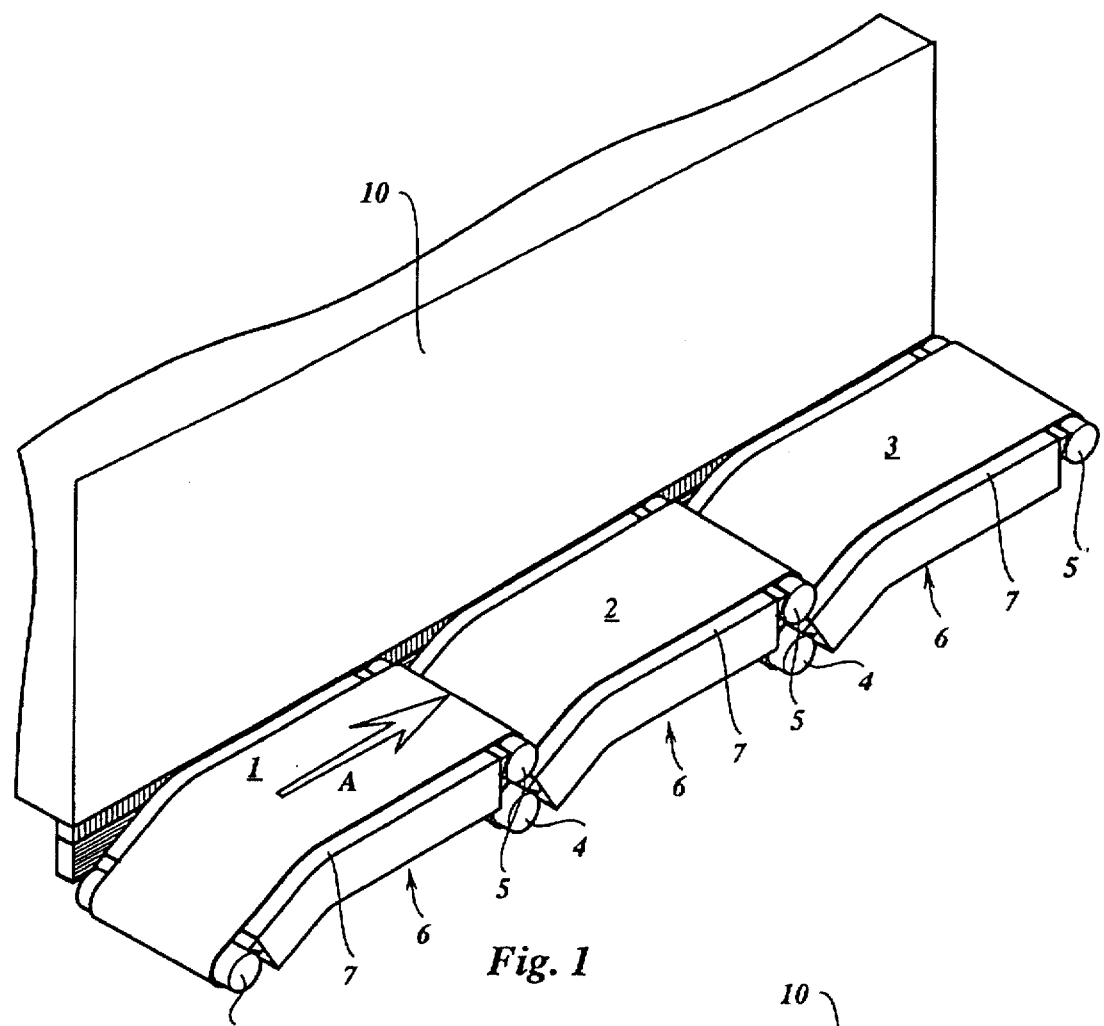
FIG. 1 is a schematic perspective view of a conveyor according to the invention comprising three endless conveyor belts.

In the embodiment shown in FIG. 1 the conveyor comprises three successive conveyor belts 1–3. It will be apparent, however, that it will also be possible to provide more or fewer conveyor belts, whilst the conveyor may also comprise additional conveying means or the like.

Each conveyor belt is passed over two guide drums or rollers 4 and 5 near its ends, which drums or rollers are rotatably supported in a frame portion 6. The upper part of each conveyor belt is passed over a guide plate 7 forming part of the frame part 6. It will be apparent, however, that it will also be possible to use supporting rollers or the like instead of such a guide plate.

Figure 2:
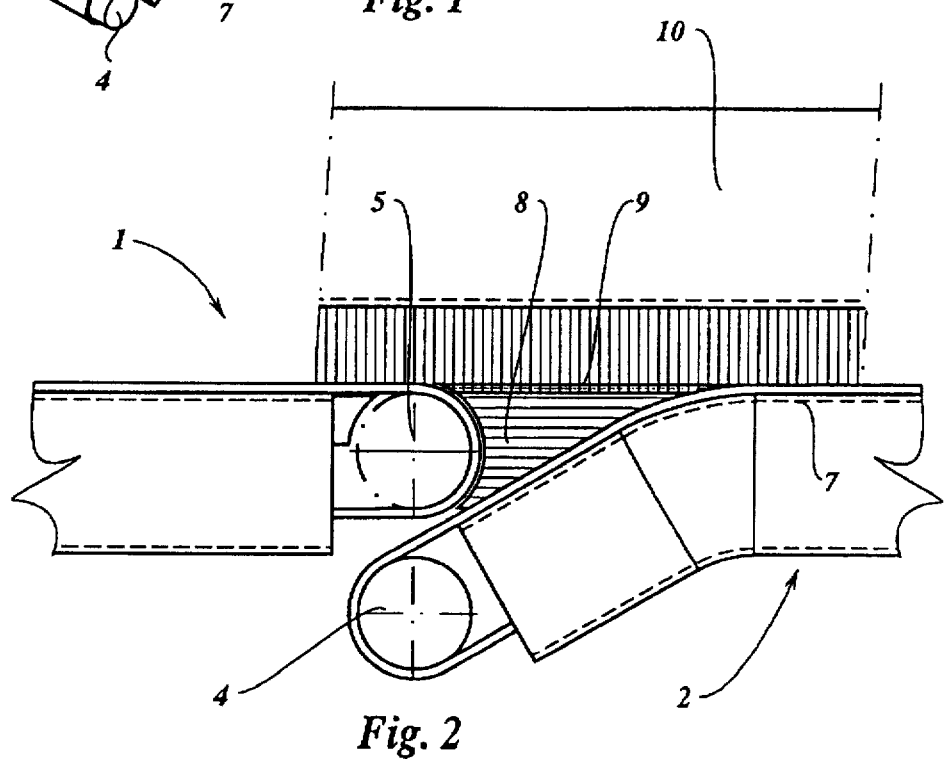
FIG. 2 is a larger-scale view of the connection at the location of the facing ends of two successive conveyor belts.

As will be apparent in particular from FIG. 2, guide drum 4 of a conveyor belt is disposed at a lower position than guide drum 5. The construction is thereby such that the upper part of the conveyor belt in question, which is effectively operative during operation, is guided into an at least substantially horizontal plane by guide plate 7, whilst the end of the upper part joining roller 4 moves over the downwardly sloping end of guide plate 7. This arrangement makes it possible to dispose the downwardly deflected end of the conveyor belt, conveyor belt 2, for example, which is positioned near guide drum 4, under the end of conveyor belt 1 that is directed towards said conveyor belt 2, more particularly, to dispose the lower guide drum or roller 4 of one conveyor belt under the guide drum or roller 5 of the other conveyor belt.

The gap thus formed between the horizontally extending upper part of the one conveyor belt and the horizontally extending part of the next conveyor belt is filled with a filling piece 8, whose upper surface 9 lies at least substantially in one plane with the two horizontally extending upper parts of the successive conveyor belts. It will be apparent that an object supplied in the direction according to arrow A by means of conveyor belt 1 will move over said upper surface 9 in the direction of the next conveyor belt 2, so that an even transfer of the object from one conveyor belt to the other is possible, whilst the risk of parts of the goods or objects to be transported undesirably getting jammed in points located at the transition from one conveyor belt to the other is practically excluded.

As is furthermore schematically shown in the Figures an upright guide member 10 extending in the longitudinal direction of the belts may be provided near one side of the belts. This may for example be desirable when the goods to be moved are supplied in a direction transversely to the longitudinal direction of the conveyor belts, in order to prevent the objects thus being supplied from moving too far and falling from the conveyor belts at the side of conveyor belts 1–3 remote from the supply side.

Although the above description relates to horizontally disposed conveyors, it will be apparent that the upper parts of the conveyor belts being in line and the plane(s) 9 lying therebetween may also occupy a slightly sloping position.

We claim:

1. A conveyor comprising at least two endless conveyor belts being in line, whereby the facing ends of said conveyor belts are positioned near each other and whereby the upper parts of the belts being utilized for transporting goods during operation at least substantially lie in one plane, characterized in that the end of one conveyor directed towards the end of the other conveyor is deflected downwards and is disposed under the nearby end of said other conveyor, whilst a filling piece is provided above the part of the downwardly deflected end of the one conveyor that is positioned beside the respective end of the other conveyor, whereby the upper surface of said filling piece at least substantially lies in one plane with the upper parts of the belts being utilized for transporting goods during operation.

2. A conveyor according to claim 1, characterized in that one conveyor belt is passed over two guide drums or rollers, one being positioned lower than the other, whilst guide members are provided near said lower guide drum or roller for guiding the part of the conveyor belt that extends along the downwardly deflected part of the conveyor belt.

3. A conveyor according to claim 2, characterized in that the guide drums or rollers disposed at the facing ends of neighbouring conveyor belts are positioned at least substantially straight above each other.

* * * * *